US010364051B1

(12) United States Patent
Turner

(10) Patent No.: US 10,364,051 B1
(45) Date of Patent: Jul. 30, 2019

(54) EFFICIENT STATIONKEEPING STRATEGY FOR THE THREE APOGEE (TAP) ORBIT

(71) Applicant: Space Systems/Loral, LLC, Palo Alto, CA (US)

(72) Inventor: Andrew E. Turner, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 303 days.

(21) Appl. No.: 15/352,471

(22) Filed: Nov. 15, 2016

(51) Int. Cl.
  *B64G 1/24*  (2006.01)
  *B64G 1/40*  (2006.01)
  (Continued)

(52) U.S. Cl.
  CPC ............... *B64G 1/242* (2013.01); *B64G 1/10* (2013.01); *B64G 1/26* (2013.01); *B64G 1/406* (2013.01)

(58) Field of Classification Search
  CPC .... B64G 1/242; B64G 1/1085; B64G 1/1007; B64G 1/26; B64G 1/007; B64G 1/405; B64G 1/1078; B64G 1/002; B64G 1/10; B64G 1/283; B64G 1/36; B64G 1/361; B64G 1/646; B64G 1/1021; B64G 1/285; B64G 1/40; B64G 1/402; B64G 1/62; B64G 1/222; B64G 1/24; B64G 1/641; B64G 1/66
  See application file for complete search history.

(56) References Cited

U.S. PATENT DOCUMENTS

| 6,695,260 B2 * | 2/2004 | Castiel ................. B64G 1/1007 244/158.4 |
| 7,664,578 B2 * | 2/2010 | Fowler ................. B64G 1/1085 701/13 |

(Continued)

FOREIGN PATENT DOCUMENTS

WO    WO 2015/160416 A2    10/2015

OTHER PUBLICATIONS

Trishchenko, A.P., Garand L., and Trichtchenko L.D. "Three-Apogee 16-h Highly Elliptical Orbit as Optimal Choice for Continuous Meteorological Imaging of Polar Regions". Journal of Atmospheric and Oceanic Technology, vol. 28, pp. 1407-1422 (Year: 2011).*

(Continued)

*Primary Examiner* — Tien Q Dinh
*Assistant Examiner* — Steven J Shur
(74) *Attorney, Agent, or Firm* — Weaver Austin Villeneuve & Sampson LLP

(57) ABSTRACT

A stationkeeping strategy for a satellite disposed in a TAP orbit includes controlling parameters of the orbit such that, for a constellation of two satellites disposed in the orbit, the constellation provides substantially continuous coverage of a polar region. The stationkeeping strategy includes one or more of: establishing an initial Right Ascension of Ascending Node (RAAN) of the operational orbit such that naturally caused orbital drift results in a mid-life RAAN of approximately 0 degrees (360 degrees); and controlling Argument of Perigee (ARGP), only indirectly, by performing orbit maintenance maneuvers only to directly control one or more of the operational orbit apogee altitude, the operational orbit perigee altitude, and inclination within a respective required range.

20 Claims, 10 Drawing Sheets

(51) Int. Cl.
*B64G 1/10* (2006.01)
*B64G 1/26* (2006.01)

(56) References Cited

U.S. PATENT DOCUMENTS 7,720,604 B1    5/2010  Cichan et al.
2007/0250267 A1  10/2007  Jaeger et al.
2015/0353209 A1  12/2015  Turner

OTHER PUBLICATIONS

Bourassa, M.J. "Dynamics and Control Lunisolar Perturbations for Highly-Eccentric Earth-orbiting Satellites", Jun. 15, 2015 [online]. Retrieved from the Internet <URL: https://curve.carleton.ca/5014587c-8db9-4bff-9b0b-172cab1336c9> <DOI: 10.22215/etd/201510996> (Year: 2015).*

Braeunig, R.A. "Orbital Mechanics", 2013 [online]. Retrieved from the Internet <URL: http://www.braeunig.us/space/orbmech.htm> (Year: 2013).*

Nassar et al., "Satellite observations of $CO_2$ from a highly elliptical orbit for studies of the Arctic and boreal carbon cycle," Journal of Geophysical Research: Atmospheres, AGU Publications., 2014, 2654-2673.

Trishchenko et al., "Three-Apogee 16-h Highly Elliptical Orbit as Optimal Choice for Continuous Meteorological Imaging of Polar Regions," DOI: 10.1175/JTECH-D-11-0048.1, Nov. 2011, 1407-1422.

* cited by examiner

EFFICIENT STATIONKEEPING STRATEGY FOR THE THREE APOGEE (TAP) ORBIT

TECHNICAL FIELD

This invention relates generally to a constellation of satellites in an inclined elliptical orbit having a nominal period of 16 hours, and more particularly to a stationkeeping strategy for an improved Three APogee (TAP) orbit.

BACKGROUND

A TAP orbit has been proposed that can provide substantially continuous imaging and/or communications coverage for a polar region using a two satellite constellation, both of the two satellites being in the same orbital plane, the orbit having a period of about 16 hours. Trishschenko, et al., "Three-Apogee 16-h Highly Elliptical Orbit as Optimal Choice for Continuous Meteorological Imaging of Polar Regions," Journal of Atmospheric and Oceanic Technology, Vol. 28, November 2011, hereinbelow, "Trishschenko". A characteristic of the proposed constellation is that one or the other of the two satellites is near orbit apogee at eight hour intervals, that is, three times per day. Since one or the other of the spacecraft is near apogee at all times, continuous coverage of the region of Earth's surface beneath the apogee is provided. By appropriate selection of the orbital plane's argument of perigee, the orbit apogee may be positioned over the Arctic or Antarctic polar regions. For example where Arctic coverage is desired, the argument of perigee is preferably set to about 270°. Where Antarctic coverage is desired, the argument of perigee is preferably set to about 90°.

The TAP orbit has an inclination greater than 60°, typically in the range of 63.4° to 70°, an eccentricity of about 0.55, a perigee altitude in the range of approximately 7000 to 15000 km (typically about 8100 km), and an apogee altitude in the range of 35,000 km to 50,000 km (typically about 43,500 km). Trishschenko, page 1412, Table 1. When a pair of satellites is disposed and maintained in such an orbit, spaced apart by eight hours (one half of the orbit period) and the argument of perigee is approximately 270°, substantially uninterrupted coverage of the Arctic region at or above 60° N latitude may be provided. Similarly, when the argument of perigee is approximately 90°, substantially uninterrupted coverage of the Antarctic region at or below 60° S latitude may be provided.

In the absence of orbit maintenance, a satellite initially disposed in a TAP orbit described above will experience considerable natural drift from desired parameters of amount of orbit inclination, argument of perigee, perigee and apogee altitude as a result of gravitational influence of the Earth, moon and sun. In the absence of the presently disclosed techniques, the annual orbit maintenance delta V requirements required to compensate for this drift are estimated as follows:

| Controlled Parameter | Delta-V (m/s/yr) |
| --- | --- |
| Inclination | 5 |
| Argument of Perigee | 54 |
| Perigee Altitude | 23 |
| Apogee Altitude | 7 |
| Total | 89 |

The above listed delta V requirements imply a very significant propellant mass, for a 10-15 year mission life, which the present techniques aimed to reduce.

SUMMARY

The presently disclosed techniques relate to a strategy for stationkeeping and orbital parameter optimization for a TAP orbit.

According to some implementations, a method of maintaining at least one satellite in an operational orbit having a nominal orbital period includes executing a stationkeeping strategy that controls parameters of the operational orbit such that, for a constellation of two satellites disposed in the operational orbit, separated by one half the nominal orbital period, the constellation provides substantially continuous coverage of a polar region, the nominal orbital period is sixteen hours, and the operational orbit has (i) an inclination of greater than 60°; (ii) a nominal eccentricity of at least 0.4; (iii) an argument of perigee (ARGP) of approximately 90° or approximately 270°; (iv) an operational orbit apogee altitude in the range of 35,000 km to 50,000 km; and (v) an operational orbit perigee altitude in the range of approximately 7000 to 15000 km. The stationkeeping strategy includes one or more of establishing an initial Right Ascension of Ascending Node (RAAN) of the operational orbit such that naturally caused orbital drift results in a mid-life RAAN of approximately 0 degrees and controlling Argument of Perigee (ARGP), only indirectly, by performing orbit maintenance maneuvers only to directly control one or more of the operational orbit apogee altitude, the operational orbit perigee altitude, and inclination within a respective required range.

In some examples, during a mission life of ten or more years, orbit maintenance maneuvers to directly control inclination may be avoided for at least seven years. In some examples, the stationkeeping strategy may include establishing an initial value of each of: orbital inclination and an initial value of ARGP, such that substantially continuous coverage of a polar region is maintained throughout the mission life. In some examples, the initial value of orbital inclination may be less than 63°. In some examples, the initial value of ARGP may be such that a mid-life ARGP is approximately 90° or approximately 270°. In some examples, the initial value of ARGP may be approximately 274° and end of life value of ARGP is 266°.

In some examples, RAAN at end of life may be approximately 250°.

In some examples, a total impulse required for the stationkeeping strategy may be allocated such that at least 70% of the total impulse is to control perigee altitude and apogee altitude and less than 30% is to control orbital inclination.

In some examples, more than 70% of the orbit maintenance maneuvers may be performed at either perigee or apogee of the orbit.

In some examples, the stationkeeping strategy may include avoiding performing orbit maintenance maneuvers for a period of at least twelve months proximate to mid-life.

According to some implementations, an earth-orbiting satellite includes a propulsion subsystem and a spacecraft controller the spacecraft is configured to be disposed in an operational orbit, and the spacecraft controller is configured to execute a stationkeeping strategy that controls parameters of the operational orbit such that, for a constellation of two satellites disposed in the operational orbit, separated by one half the nominal orbital period, the constellation provides substantially continuous coverage of a polar region. The nominal orbital period is sixteen hours, and the operational orbit has (i) an inclination of greater than 60 degrees; (ii) a nominal eccentricity of at least 0.4; (iii) an argument of perigee (ARGP) of approximately 90° or approximately 270°; (iv) an operational orbit apogee altitude in the range of 35,000 km to 50,000 km; and (v) an operational orbit perigee altitude in the range of approximately 7000 to 15000 km. The stationkeeping strategy includes one or more of: selecting an initial Right Ascension of Ascending Node (RAAN), such that naturally caused orbital drift results in a mid-life RAAN of approximately 0 degrees; and controlling Argument of Perigee (ARGP) only indirectly, by causing the propulsion subsystem to execute orbit maintenance maneuvers only to directly control one or more of the operational orbit apogee altitude, the operational orbit perigee altitude, and inclination within a respective required range.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

The present inventor has developed a stationkeeeping strategy that substantially reduces that orbit maintenance delta V required for a satellite in a TAP orbit. The stationkeeping strategy may take into account the satellite mission life and start date, and includes one or both of the following aspects: (1) Judiciously selecting the initial value of the orbit's right ascension of ascending node (RAAN) such that naturally caused orbital drift results in RAAN passing through zero at mid-life (e.g., starting at 100° for a 15-year mission, RAAN will be 0° (360°) at about 7.5 years after mission start date); and (2) controlling the orbit's Argument of Perigee (ARGP) only indirectly, by performing orbit maintenance maneuvers only to directly control one or more of the orbit's apogee altitude, perigee altitude, and inclination within a respective required range.

In addition, in some implementations, the stationkeeping strategy includes selecting an initial value of each of orbit inclination and ARGP so as to minimize stationkeeping delta V while still complying with requirement to provide substantially continuous coverage of a polar region throughout the mission life. For example, the present inventor has discovered that, by establishing an initial orbit inclination slightly below 63° and an initial ARGP such that a mid-life ARGP is approximately 270° (for Arctic coverage) or 90° (for Antarctic coverage), stationkeeping maneuvers for inclination control may be substantially reduced or avoided altogether, depending on the satellite mission life.

Figure 1:
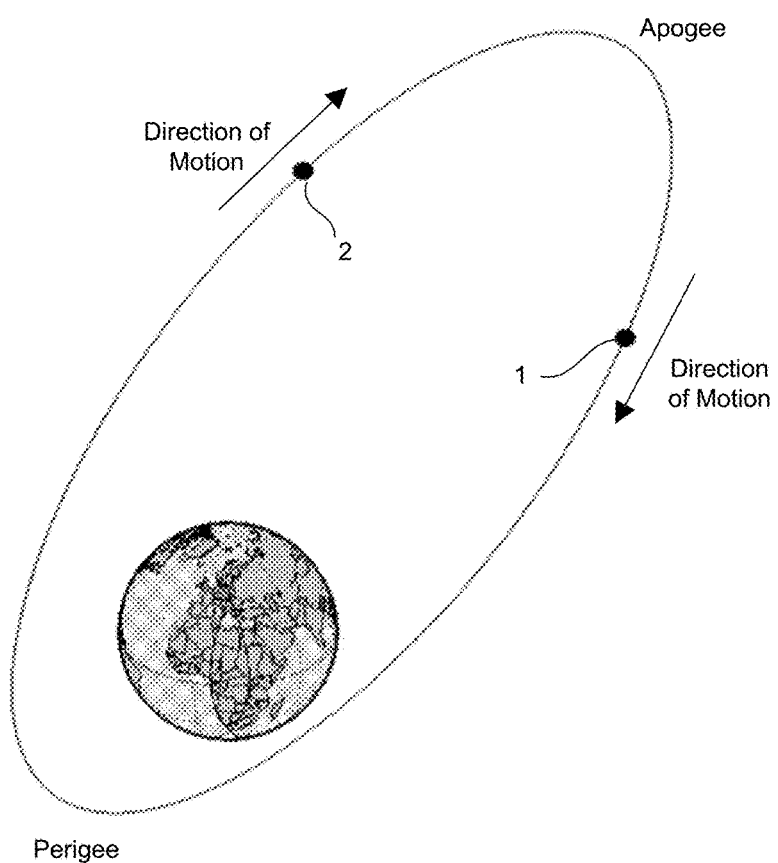
FIG. 1 illustrates a TAP orbit as viewed from deep space.
Figure 2:
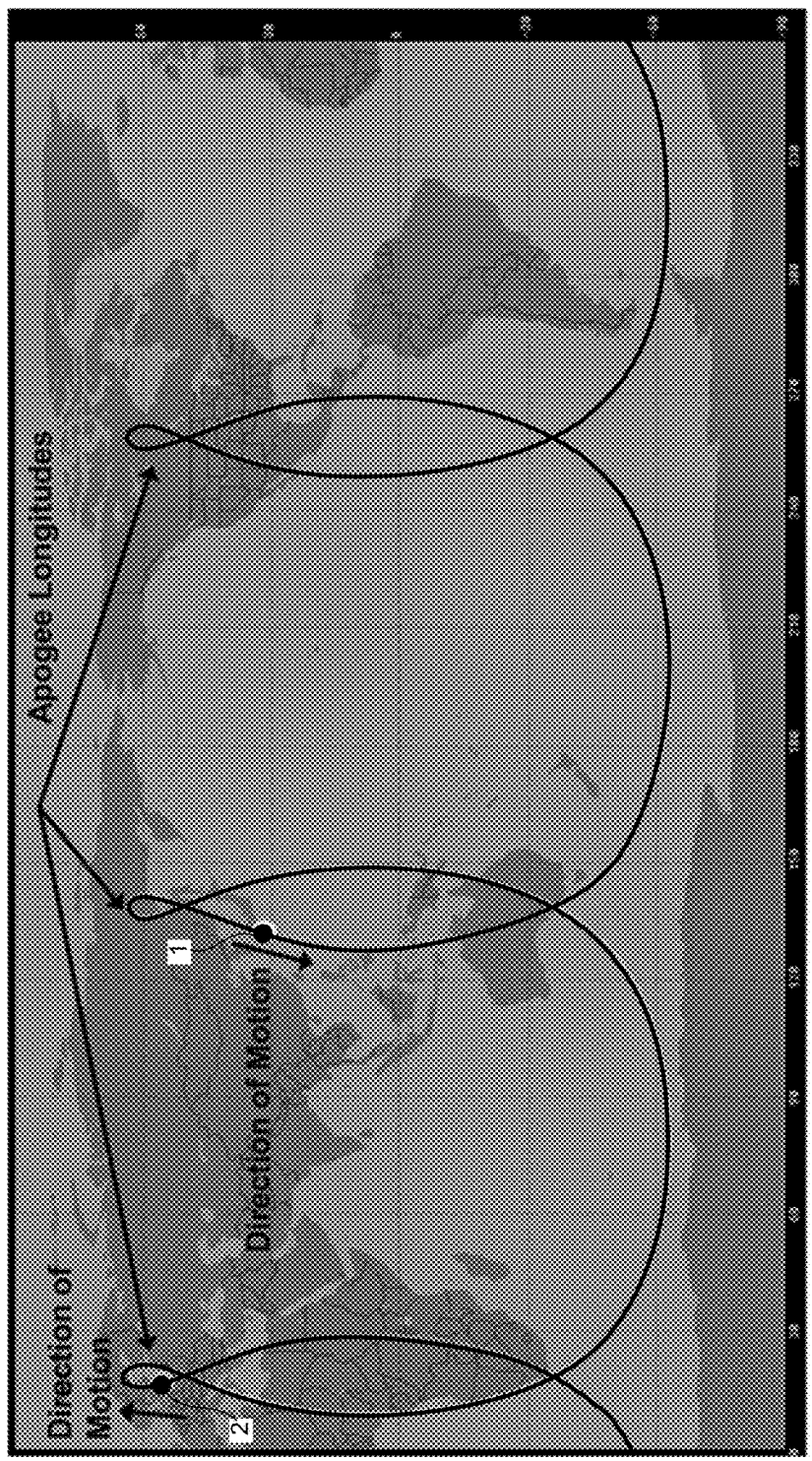
FIG. 2 illustrates a ground track of two spacecraft in the TAP orbit relative to the earth.

The present innovative techniques may be better appreciated by referring first to FIG. 1, which illustrates the foreseen TAP operational orbit as viewed from deep space. Each of a first spacecraft 1 and a second spacecraft 2 is disposed in a common inclined elliptical orbit. In the illustrated implementation, the TAP operational orbit is configured to have an ARGP of approximately 270°; as a result, the orbit's apogee is located near a high northerly latitude. FIG. 2 illustrates ground tracks of the first spacecraft 1 and the second spacecraft 2 relative to the earth. It may be observed that the two spacecraft are on a common ground track and pass over the same points on the surface of the earth.

Figure 3:
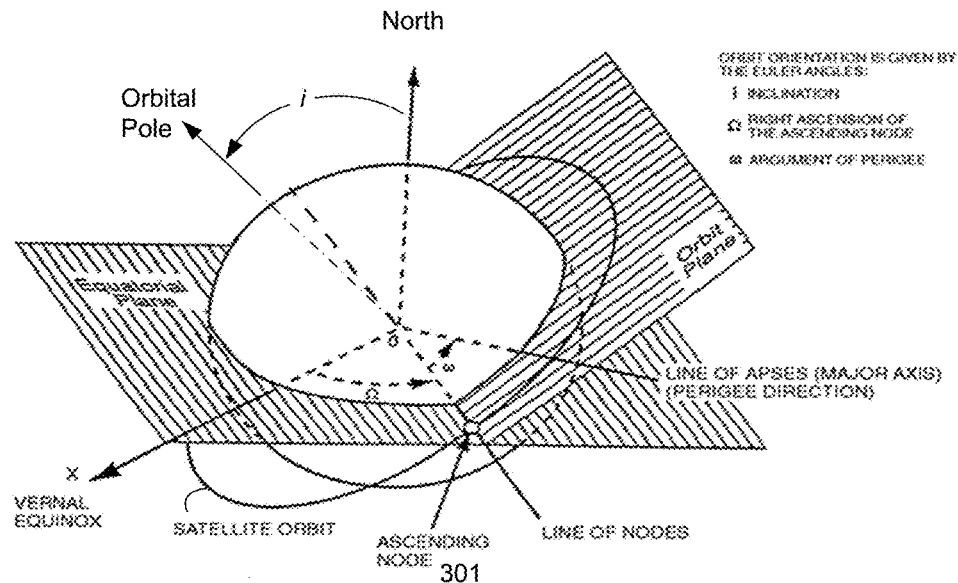
FIG. 3 illustrates orbital parameters of an inclined orbit.
Figure 3:
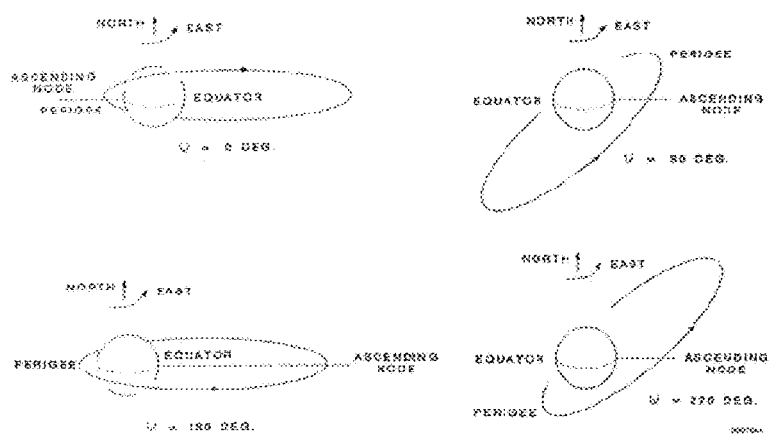

Referring to FIG. 3, it may be observed that the satellite orbit is disposed in an orbit plane that crosses the plane of the equator at respective nodes (i.e., an ascending node 301 and a descending node (not illustrated) that is separated by 180° from the ascending node). The satellite orbit has a characteristic angle (Ω) of right ascension of the ascending node (RAAN), an inclination (i), and an argument of perigee (ω or ARGP) as defined in FIG. 3. In the absence of the presently disclosed techniques, ARGP may be actively and directly controlled by stationkeeping in order to maintain ARGP at a desired value (near 270° where Arctic coverage is desired). As indicated above by the annual delta-V requirement of 89 m/s/yr, the delta V required for such stationkeeping may exceed 750 m/s over the course of a 15 year mission.

Figure 4:
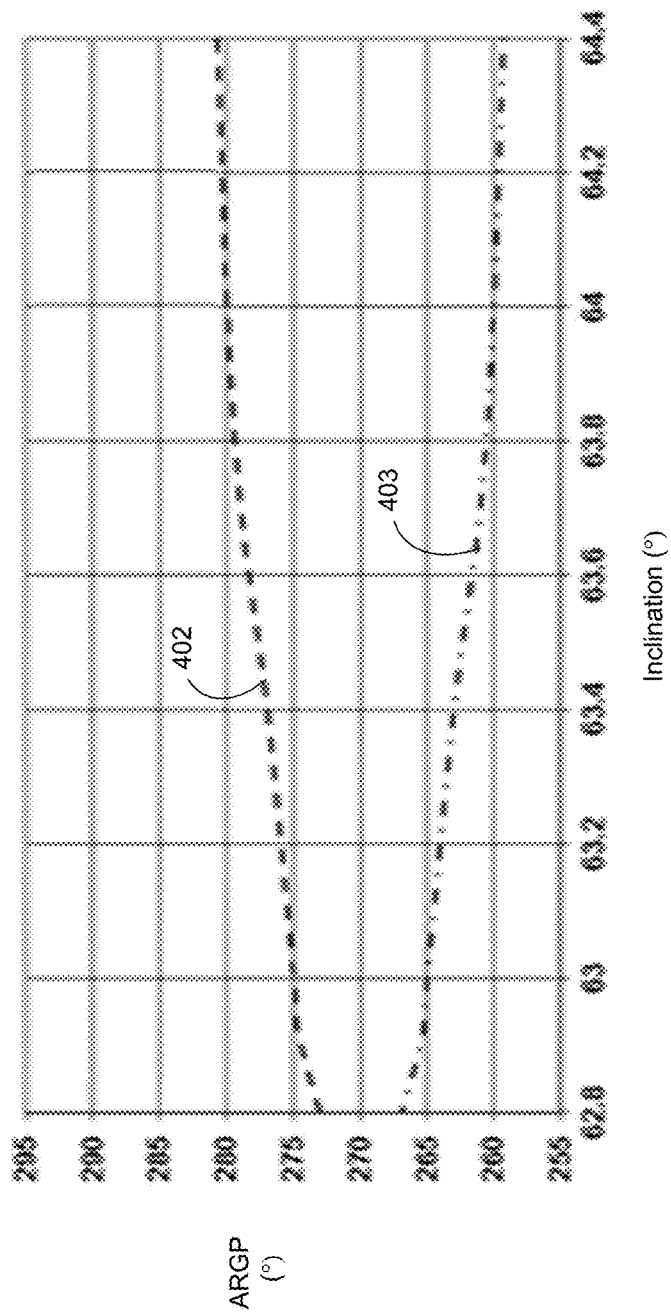
FIG. 4 illustrates requirements for ARGP vs inclination, according to an implementation.

For a typical mission requirement of providing continuous coverage for all points north of 70° N latitude, a satellite in the TAP orbit may be required to be maintained within an envelope of ARGP vs Inclination as shown in FIG. 4. It may be observed that an upper limit 402 of acceptable ARGP ranges from about 273° when the orbital inclination is 62.8° to about 281° when the orbital inclination is 64.4°. It may be also observed that a lower limit 403 of acceptable ARGP ranges from about 267° when the orbital inclination is 62.8° to about 259° when the orbital inclination is 64.4°.

Figure 5:
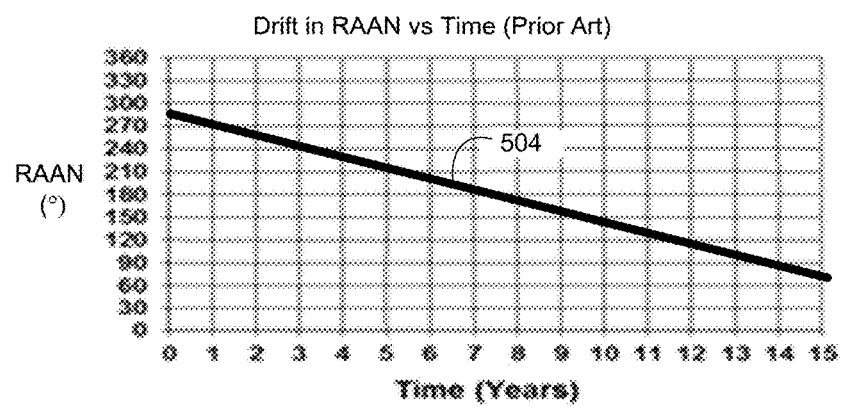
FIG. 5 illustrates drift in RAAN, according to the prior art.

The rate at which ARGP and inclination are perturbed by naturally occurring gravitational forces varies as a function of the orbit's RAAN and inclination. RAAN, in the absence of countervailing stationkeeping maneuvers, can be expected to drift systematically with time as shown in FIG. 5. A plot 504 illustrated in FIG. 5 assumes a starting value of 280°, based on heritage experience with geosynchronous spacecraft.

The present inventor has appreciated that perturbations in orbital inclination, apogee and perigee altitude are minimal when RAAN is at 0° (360°) and that the direction of perturbing forces changes signs as RAAN drifts across the 0° (360°) position. In view of this appreciation, the presently disclosed techniques contemplate selecting an initial value of RAAN such that RAAN drifts past 0° (360°) at approximately satellite midlife. For example, referring to FIG. 6, for a nominal 15 year mission, plot 605 illustrates that an initial RAAN may be set to 100° with the expectation that RAAN will drift past 0° (360°) during the eighth year of the mission.

Figure 7:
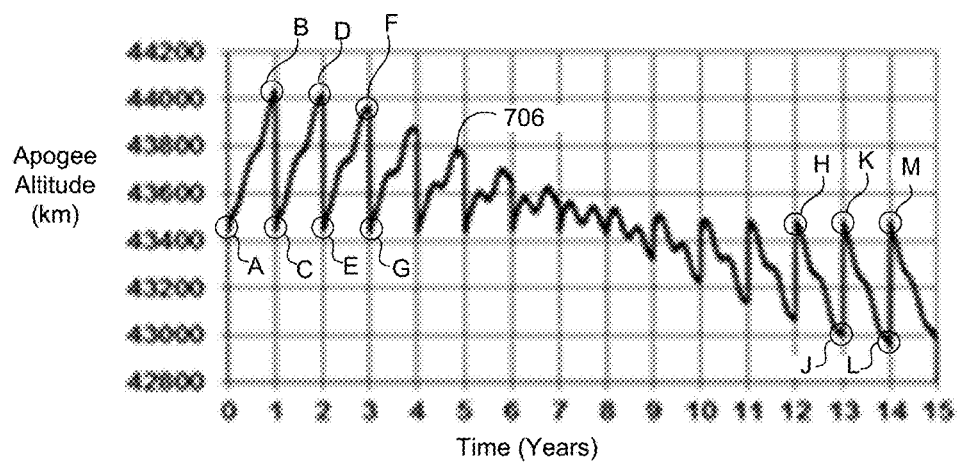
FIG. 7 illustrates apogee altitude as a function of time, according to an implementation.
Figure 8:
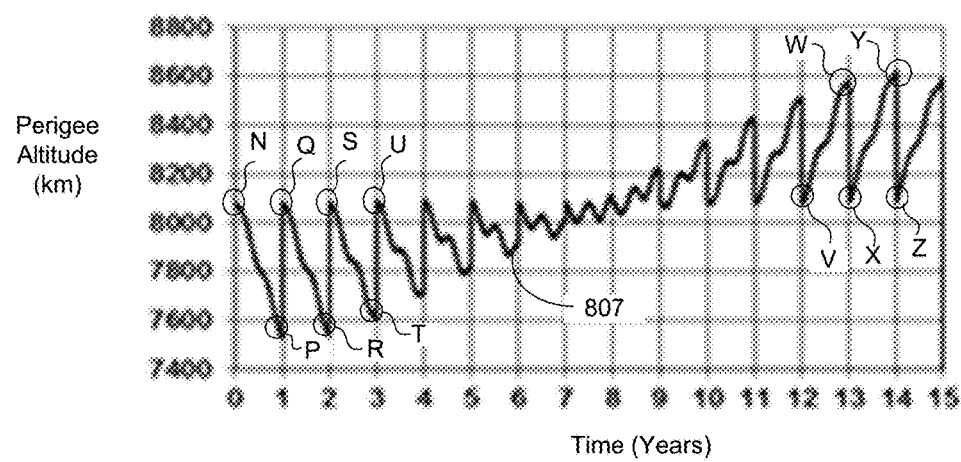
FIG. 8 illustrates perigee altitude as a function of time, according to an implementation.

Consequences of the above described strategy may be observed by referring to FIGS. 7 and 8. FIG. 7 illustrates a plot 706 of apogee altitude versus time. FIG. 8 illustrates a plot 807 of perigee altitude versus time. For clarity of illustration, FIG. 7 and FIG. 8 each depicts a case in which a single correcting delta V maneuver is performed each year. It will be appreciated, however, that an actual stationkeeping strategy may contemplate considerably more frequent stationkeeping maneuvers (of smaller magnitude) during the course of each year.

Figure 6:
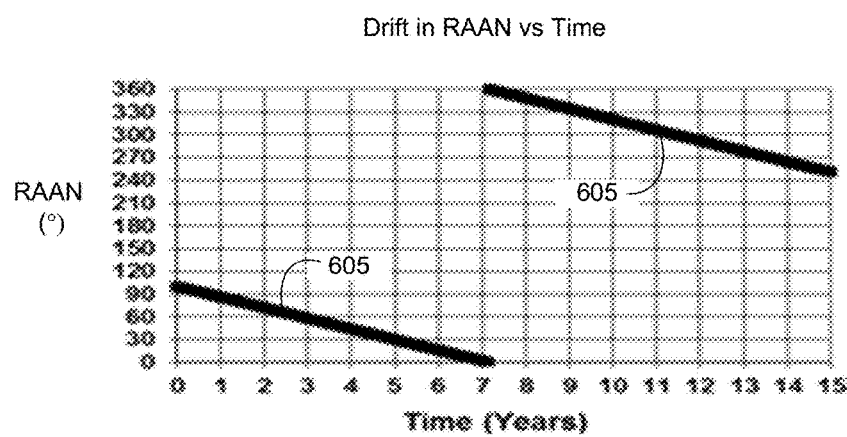
FIG. 6 illustrates drift in RAAN, according to an implementation.

Referring first to FIG. 7, the plot 706 shows the magnitude and direction of correcting delta V maneuvers required to maintain apogee altitude. For example, starting from point 'A' at beginning of life, an apogee altitude having an initial value of approximately 43,400 km is shown to drift higher during the first year to point 'B', at which point a correcting delta V maneuver is executed to return the apogee altitude to the initial value (at point 'C'). Subsequently, the apogee altitude again drifts higher during the second year to point 'D' at which point a correcting delta V maneuver is executed to return the apogee altitude to the initial value (at point 'E'). Subsequently, the apogee altitude again drifts higher during the third year to point 'F' at which point a correcting delta V maneuver is executed to return the apogee altitude to the initial value (at point 'G'). It may be observed that the magnitude of required corrections becomes smaller until the direction of natural drift reverses in the eighth year as RAAN drifts past 0°/360° (FIG. 6). This may permit, in some implementations, certain corrective maneuvers to be skipped for some months prior to and following the reversal of the direction of correction, thus further reducing the total delta V for stationkeeping. Subsequent to the reversal in natural drift direction, correcting delta V maneuvers may be executed to raise apogee. For example, starting from point 'H' at the beginning of the thirteenth year, an apogee altitude having an initial value of approximately 43,400 km is shown to drift lower, to point 'J', at which point a correcting delta V maneuver is executed to return the apogee altitude to the initial value (at point 'K'). Subsequently, the apogee altitude again drifts lower during the fourteenth year to point 'L' at which point a correcting delta V maneuver is executed to return the apogee altitude to the initial value (at point 'M'). Subsequently, the apogee altitude again drifts lower during the fifteenth year until the assumed end of mission life.

Referring now to FIG. 8, the plot 807 shows the magnitude and direction of correcting delta V maneuvers required to maintain apogee altitude. For example, starting from point 'N' at beginning of life, a perigee altitude having an initial value of approximately 8100 km is shown to drift lower during the first year to point 'P', at which point a correcting delta V maneuver is executed to return the perigee altitude to the initial value (at point 'Q'). Subsequently, the perigee altitude again drifts lower during the second year to point 'R' at which point a correcting delta V maneuver is executed to return the perigee altitude to the initial value (at point 'S'). Subsequently, the perigee altitude again drifts lower during the third year to point 'T' at which point a correcting delta V maneuver is executed to return the perigee altitude to the initial value (at point 'U'). It may be observed that the magnitude of required corrections becomes smaller until the direction of natural drift reverses in the eighth year as RAAN drifts past 0°/360° (FIG. 6). This may permit, in some implementations, certain corrective maneuvers to be skipped for some months prior to and following the reversal of the direction of correction, thus further reducing the total delta V for stationkeeping. Subsequent to the reversal in natural drift direction, correcting delta V maneuvers may be executed to lower perigee. For example, starting from point 'V' at the beginning of the thirteenth year, a perigee altitude having an initial value of approximately 8100 km is shown to drift higher, to point 'W', at which point a correcting delta V maneuver is executed to return the perigee altitude to the initial value (at point 'X'). Subsequently, the perigee altitude again drifts higher during the fourteenth year to point 'Y' at which point a correcting delta V maneuver is executed to return the perigee altitude to the initial value (at point 'Z'). Subsequently, the perigee altitude again drifts higher during the fifteenth year until the assumed end of mission life.

Figure 9:
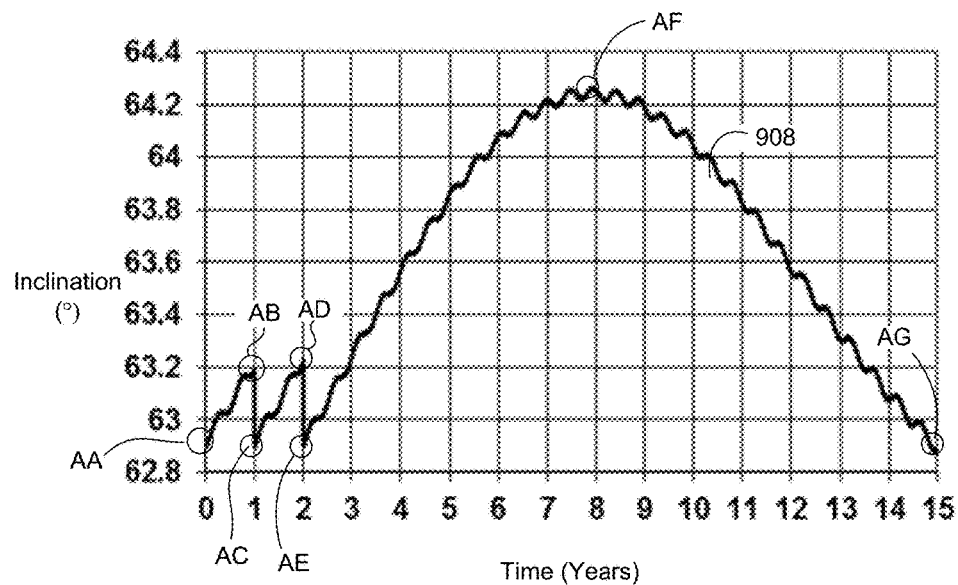
FIG. 9 illustrates inclination as a function of time, according to an implementation.
Figure 10:
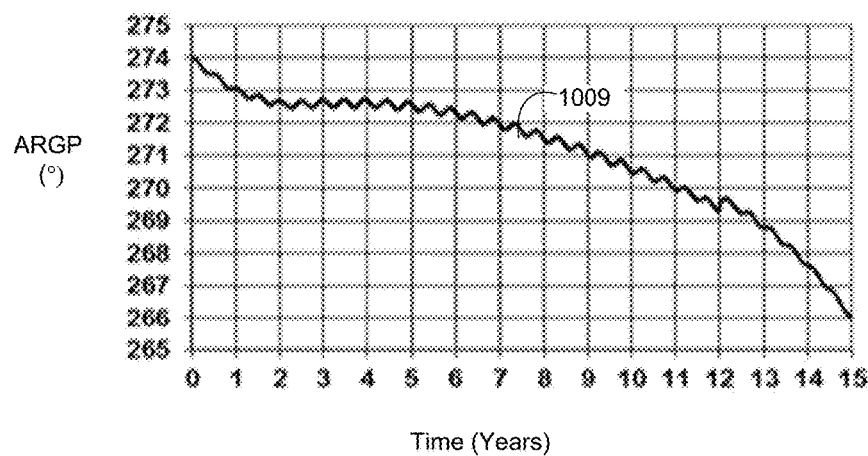
FIG. 10 illustrates ARGP as a function of time, according to an implementation.

FIGS. 9 and 10 illustrate, respectively, inclination and ARGP as a function of time. Referring first to FIG. 9, it may be observed from plot 908 that orbital inclination, which, in the illustrated implementation, is initially selected as approximately 62.9° (at point 'AA') reaches a maximum of slightly less than 64.3° (at point 'AF') in the eighth year and then drifts back toward the initial value of 62.9° at assumed end of mission life (point AG). In the illustrated example, it is contemplated that stationkeeping maneuvers to directly correct inclination drift will be executed only during the first two years, and that inclination will subsequently be allowed to drift naturally. It will be appreciated that, for a mission duration shorter than approximately 13 years, it would be possible to avoid inclination correction maneuvers entirely. For clarity of illustration, FIG. 9 depicts a case in which a single correcting delta V maneuver is performed at the end of the first and second year. It will be appreciated, however, that an actual stationkeeping strategy may contemplate considerably more frequent stationkeeping maneuvers (of smaller magnitude) during the course of each year. According to the example illustrated by plot 908, inclination is permitted to drift during the first year from an initial value of about 62.9° (point 'AA') to a value of about 63.2° (point 'AB') at which point a correcting delta V maneuver is executed to return the inclination to the initial value (at point 'AC'). Subsequently the inclination again drifts higher during the second year to point AD, at which point a correcting delta V maneuvers executed to return the inclination to the initial value (point 'AE'). Subsequently, in the illustrated example, inclination may be allowed to drift naturally as described above.

Referring now to FIG. 10, it may be observed that drift in ARGP, shown as plot 1009, which the presently disclosed techniques avoid directly correcting, causes an initially selected value for ARGP of 274° to gradually reach 266° at the end of the fifteenth year after trending downward during the mission.

Figure 11:
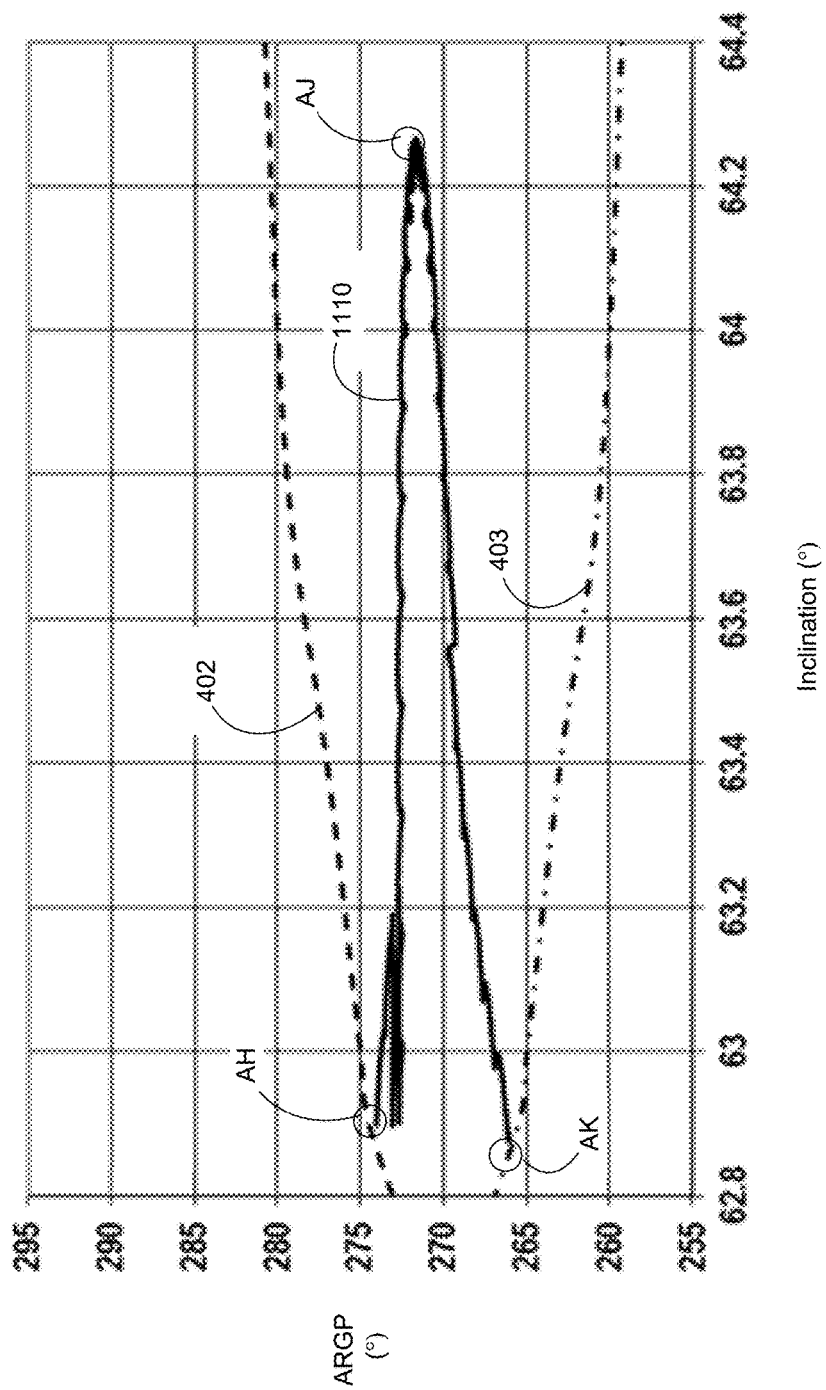
FIG. 11 illustrates ARGP versus inclination, according to an implementation.

FIG. 11 presents ARGP versus inclination, plot 1110, as a result of executing the above-described strategy overlaid with the required limits 402 and 403 previously presented in FIG. 4. Plot 1110 illustrates the progression of ARGP vs inclination from beginning of life (point 'AH') through mid-life (point 'AJ') through end of assumed mission life (point 'AK'). It may be observed that the predicted values of ARGP versus inclination are in compliance with the required limits throughout the mission life.

Figure 12:
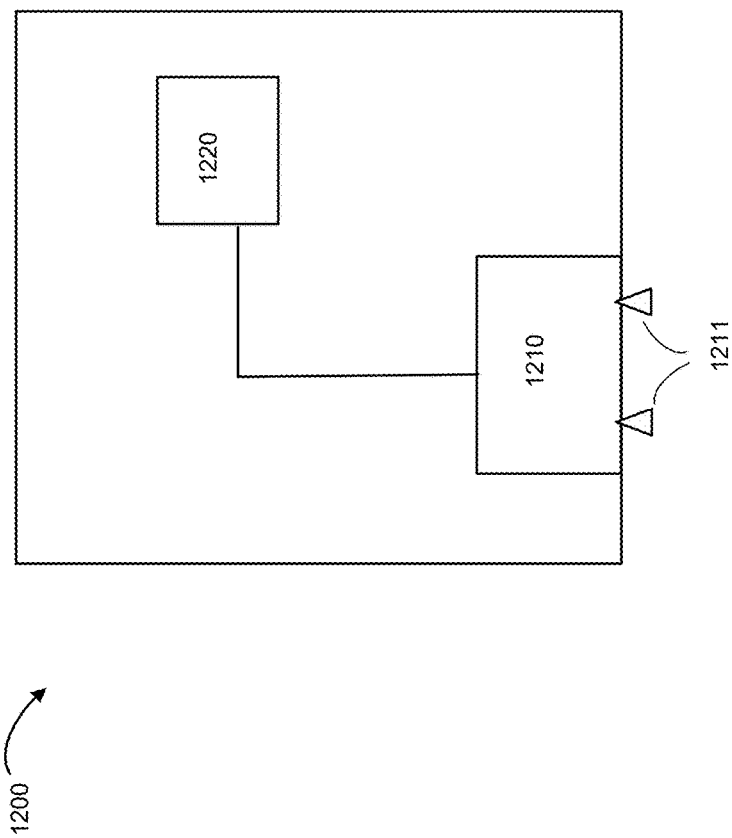
FIG. 12 illustrates a simplified block diagram of a spacecraft, according to an implementation.

Referring now to FIG. 12, an example block diagram of a spacecraft 1200 according to an embodiment is illustrated. Spacecraft 1200 may include propulsion subsystem 1210 and spacecraft controller 1220. In an embodiment, for example, propulsion subsystem 1210 may include propulsion equipment, such as tankage and control and service devices (not illustrated) and thrusters 1211. Based on the respective primary energy source, each thruster 1211 may be broadly categorized as either "chemical" or "electric".

Chemical thrusters, whether the propellant is solid or liquid, monopropellant or bipropellant, deliver thrust by converting chemical energy stored in the propellant to kinetic energy delivered to combustion products of the chemical propellant. Chemical thrusters, as the term is used herein, and in the claims, also include electrothermal thrusters such as arcjets that are configured to use electrical energy to increase the temperature, and, therefore, the velocity of the combustion products of chemical propellants.

In contrast, an electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a heavy noble gas, such as xenon or argon. Irrespective of the selected propellant, a negligible amount of thrust results from energy chemically stored in the propellant. The term electric thruster, as used herein and in the claims, encompasses an electrostatic thruster, an electromagnetic thruster, a Hall Effect thruster, a wakefield accelerator, and a traveling wave accelerator, for example.

Referring still to FIG. 12, spacecraft controller 1220 may include or be included in a spacecraft attitude and orbit control subsystem. In the illustrated example, spacecraft controller 1220 is communicatively coupled with propulsion subsystem 1210 and may be configured to control the operation of propulsion subsystem 1210, including thrusters 1211.

Spacecraft controller 1220 may be configured to execute a stationkeeping strategy by causing the propulsion subsystem to perform one or more maneuvers. Each maneuver may include either or both of a chemical thruster firing and an electric thruster firing. The spacecraft controller 1220 may be configured to execute a stationkeeping strategy that controls parameters of the operational orbit. The stationkeeping strategy may include one or more of: selecting an initial Right Ascension of Ascending Node (RAAN), such that naturally caused orbital drift results in a mid-life RAAN of approximately 0 degrees; and controlling Argument of Perigee (ARGP) only indirectly, by causing the propulsion subsystem to execute orbit maintenance maneuvers only to directly control one or more of the operational orbit apogee altitude, the operational orbit perigee altitude, and inclination within a respective required range.

Figure 13:
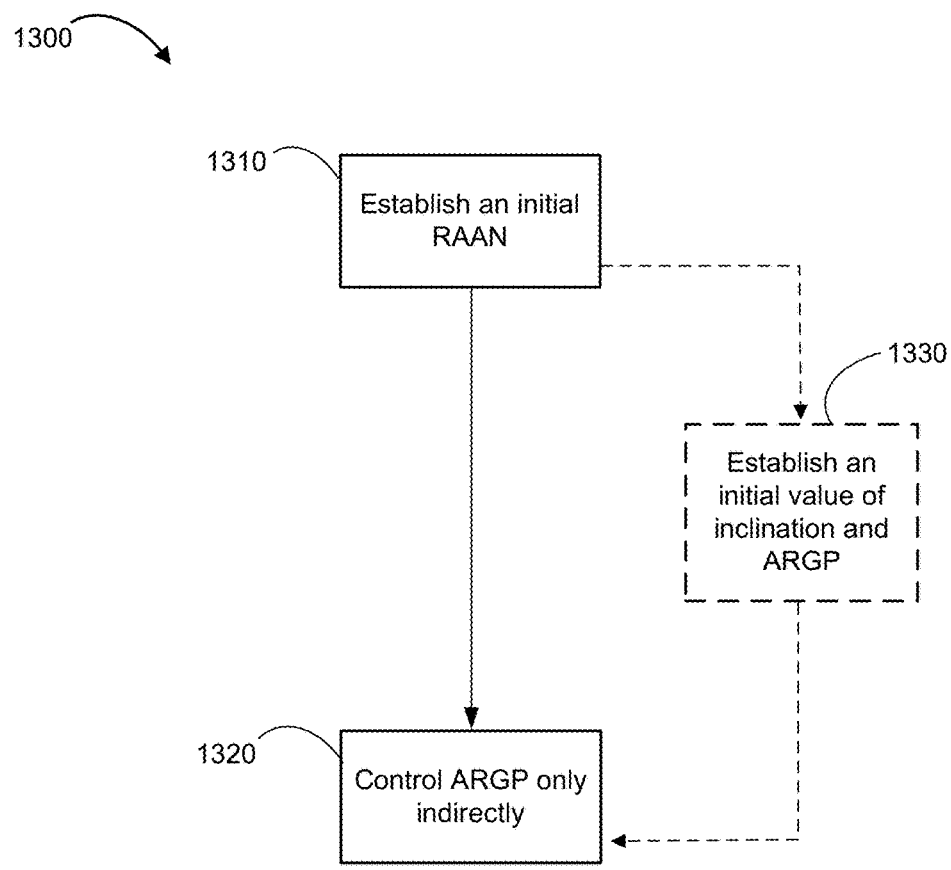
FIG. 13 illustrates a method of maintaining a satellite in an operational orbit, according to an implementation.

FIG. 13 illustrates a method 1300 of maintaining a satellite in an operational orbit. As described above, the operational orbit may be a TAP orbit having nominal orbital period of sixteen hours. It is contemplated that, for a constellation of two satellites disposed in the operational orbit, the satellites separated by one half the nominal orbital period, the constellation may provide substantially continuous coverage of a polar region. The operational orbit may have (i) an inclination of greater than 60°; (ii) a nominal eccentricity of at least 0.4; (iii) an ARGP of approximately 90° or approximately 270°; (iv) an operational orbit apogee altitude in the range of 35,000 km to 50,000 km; and (v) an operational orbit perigee altitude in the range of approximately 7000 to 15000 km.

The method 1300 may start, at block 1310, with establishing an initial establishing an initial Right Ascension of Ascending Node (RAAN) of the operational orbit. The satellite may have an expected mission life, and the initial RAAN may be selected such that naturally caused orbital drift results in the operational orbit's RAAN drifting across 0/360° at approximately the midpoint of the expected mission life ("mid-life").

The method may continue, at block 1320, with controlling ARGP, only indirectly, by performing orbit maintenance maneuvers only to directly control one or more of the operational orbit apogee altitude, the operational orbit perigee altitude, and inclination within a respective required range. Optionally, the method 1300 may include, at block 1330, establishing an initial value of orbital inclination and an initial value of ARGP. The initial value of orbital inclination and an initial value of ARGP may be selected so as to provide that substantially continuous coverage of a polar region is maintained throughout the expected mission life.

The present inventor has determined that the approximate average annual orbit maintenance delta V required using the above-described stationkeeping strategy is approximately estimated in the following table, which demonstrates that a considerable reduction in delta −V and, consequently, propellant mass is achieved by the disclosed techniques.

| Controlled Parameter | Delta-V (m/s/yr) |
| --- | --- |
| Inclination | 3.7 |
| Argument of Perigee | 0 |
| Perigee Height | 17 |
| Apogee Height | 4.9 |
| Total | 26 |

Thus, techniques for stationkeeping a satellite disposed in a TAP orbit have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method of maintaining at least one satellite in an operational orbit having a nominal orbital period, the method comprising:

executing a stationkeeping strategy that controls parameters of the operational orbit such that, for a constellation of two satellites disposed in the operational orbit, separated by one half the nominal orbital period, the constellation provides substantially continuous coverage of a polar region, wherein:

the nominal orbital period is sixteen hours, and the operational orbit has (i) an inclination of greater than 60°; (ii) a nominal eccentricity of at least 0.4; (iii) an initial argument of perigee (ARGP) of 90°+/−4° or 270°+/−4°; (iv) an operational orbit apogee altitude in the range of 35,000 km to 50,000 km; and (v) an operational orbit perigee altitude in a range of 7000 to 15000 km; and the stationkeeping strategy includes:

establishing an initial Right Ascension of Ascending Node (RAAN) of the operational orbit such that naturally caused orbital drift results in a mid-life RAAN of 0 degrees; and controlling the ARGP, only indirectly, by performing, with a propulsion subsystem of the spacecraft, orbit maintenance maneuvers only to directly control one or both of the operational orbit apogee altitude and the operational orbit perigee altitude within a respective required range.

2. The method of claim 1, wherein, during a mission life of ten or more years, the orbit maintenance maneuvers exclude direct control of the inclination for at least seven years.

3. The method of claim 2, wherein the stationkeeping strategy includes establishing each of: an initial value of orbital inclination and an initial value of ARGP, such that substantially continuous coverage of a polar region is maintained throughout the mission life.

4. The method of claim 3, wherein the initial value of orbital inclination is less than 63°.

5. The method of claim 3, wherein the initial value of ARGP is such that a mid-life ARGP is 90° or 270°.

6. The method of claim 3, wherein the initial value of ARGP is 274° and ARGP at end of expected mission life is 266°.

7. The method of claim 1, wherein RAAN at end of life is approximately 250°.

8. The method of claim 1, wherein a total impulse required for the stationkeeping strategy is allocated such that at least 70% of the total impulse is to control the operational orbit perigee altitude and the operational orbit apogee altitude and less than 30% is to control the inclination.

9. The method of claim 1, wherein more than 70% of the orbit maintenance maneuvers are performed at either perigee or apogee of the orbit.

10. The method of claim 1, wherein the stationkeeping strategy excludes performance of the orbit maintenance maneuvers for a period of at least twelve months proximate to mid-life.

11. An earth-orbiting satellite comprising a propulsion subsystem and a spacecraft controller, wherein:
the spacecraft is configured to be disposed in an operational orbit, and
the spacecraft controller is configured to execute a stationkeeping strategy that controls parameters of the operational orbit such that, for a constellation of two satellites disposed in the operational orbit, separated by one half the nominal orbital period, the constellation provides substantially continuous coverage of a polar region, wherein:
the nominal orbital period is sixteen hours, and the operational orbit has (i) an inclination of greater than 60 degrees; (ii) a nominal eccentricity of at least 0.4; (iii) an initial argument of perigee (ARGP) of approximately 90°+/−4° or approximately 270°+/−4°; (iv) an operational orbit apogee altitude in the range of 35,000 km to 50,000 km; and (v) an operational orbit perigee altitude in the range of approximately 7000 to 15000 km; and
the stationkeeping strategy includes:
selecting an initial Right Ascension of Ascending Node (RAAN), such that naturally caused orbital drift results in a mid-life RAAN of approximately 0 degrees; and
controlling Argument of Perigee (ARGP) only indirectly, by causing the propulsion subsystem to execute orbit maintenance maneuvers only to directly control one or both of the operational orbit apogee altitude and the operational orbit perigee altitude within a respective required range.

12. The satellite of claim 11, wherein, during a mission life of ten or more years, the orbit maintenance maneuvers exclude direct control of the inclination for at least seven years.

13. The satellite of claim 12, wherein the stationkeeping strategy includes establishing each of: an initial value of orbital inclination and an initial value of ARGP, such that substantially continuous coverage of a polar region is maintained throughout the mission life.

14. The satellite of claim 13, wherein the initial value of orbital inclination is less than 63°.

15. The satellite of claim 13, wherein the initial value of ARGP is such that a mid-life ARGP is 90° or 270°.

16. The satellite of claim 13, wherein the initial value of ARGP is 274° and ARGP at end of expected mission life is 266°.

17. The satellite of claim 11, wherein RAAN at end of life is 250°.

18. The satellite of claim 11, wherein a total impulse required for the stationkeeping strategy is allocated such that at least 70% of the total impulse is to control the operational orbit perigee altitude and the operational orbit apogee altitude and less than 30% is to control orbital inclination.

19. The satellite of claim 11, wherein more than 70% of the orbit maintenance maneuvers are performed at either perigee or apogee of the orbit.

20. The satellite of claim 11, wherein the stationkeeping strategy excludes performance of the orbit maintenance maneuvers for a period of at least twelve months proximate to mid-life.

* * * * *